(12) United States Patent
Renaud et al.

(10) Patent No.: US 7,429,339 B2
(45) Date of Patent: Sep. 30, 2008

(54) MAGNETIC NANOMATERIALS AND SYNTHESIS METHOD

(75) Inventors: Philippe Renaud, Toulouse (FR); Frederic Dumestre, Toulouse (FR); Bruno Chaudret, Vigoulet (FR); Marie Claire Fromen, Toulouse (FR); Marie-Jose Casanove, Toulouse (FR); Peter Zurcher, Tempe, AZ (US); Roland Stumpf, Livermore, CA (US); Catherine Amiens, Toulouse (FR)

(73) Assignee: Freescale Semiconductor, Inc., Austin, TX (US)

( * ) Notice: Subject to any disclaimer, the term of this patent is extended or adjusted under 35 U.S.C. 154(b) by 371 days.

(21) Appl. No.: 10/505,701

(22) PCT Filed: Feb. 6, 2003

(86) PCT No.: PCT/EP03/01165

§ 371 (c)(1),
(2), (4) Date: Apr. 27, 2005

(87) PCT Pub. No.: WO03/071561

PCT Pub. Date: Aug. 28, 2003

(65) Prior Publication Data

US 2005/0200438 A1  Sep. 15, 2005

(30) Foreign Application Priority Data

Feb. 25, 2002  (EP) .................... 02290455

(51) Int. Cl.
*H01K 1/00* (2006.01)

(52) U.S. Cl. ............. 252/62.54; 252/62.55; 252/62.52; 428/403; 428/407; 977/838; 977/830; 977/810

(58) Field of Classification Search ............... 252/62.54, 252/62, 52, 62.55; 977/838, 830, 810; 428/403, 428/407
See application file for complete search history.

(56) References Cited

U.S. PATENT DOCUMENTS 5,456,986 A * 10/1995 Majetich et al. ............. 428/403

FOREIGN PATENT DOCUMENTS

EP  1039488 A1  9/2000

(Continued)

OTHER PUBLICATIONS

Shafi et a, "Surfactant-Assisted Self-Organization of Cobalt Nanoparticles in a Mganetic Fluid", Advanced Materials, 10, No. 8, pp. 590-593, Feb. 6, 1998.*

(Continued)

*Primary Examiner*—C. Melissa Koslow

(57) ABSTRACT

A magnetic nanoparticle (22), a magnetic nanomaterial (30), assembly (30), and a method for synthsising a magnetic nanoparticle, relating to thermodynamically stable and air stable ferromagnetic nanoparticles of adjustable aspect ratio made upon decomposition of organometallic precursors in solution in the presence of a reaction gas and a mixture of organic ligands. The magnetic nanomaterial comprises magnetic nanoparticles of homogeneous size, shape, and magnetic orientation that comprises a magnetic core (24, 34) ferromagnetic at room temperature and/or operating temperatures, and a non-magnetic matrix (26, 36) encapsulating the magnetic core. This magnetic nanomaterial could be used in high frequency integrated circuit applications, such as used in wireless portable electronic devices, to enchance magnetic field confinement and improve passive component performance at MHz and GHz frequency in a variety of passive and active devices, such as transformers, on-chip signal isolation, inductors, and the like.

9 Claims, 3 Drawing Sheets

FOREIGN PATENT DOCUMENTS

WO          WO 98/22942       *   5/1998

OTHER PUBLICATIONS

Turgut et al, "Magnetic properties and microstructural observations of oxide coated FeCo nanocrystals before and after compaction", Jor. Appl. Phys., vol. 85, No. 8, pp. 4406-4408, Apr. 1999.*

Sun et al, "Monodisperse FePt Nanoparticles and Ferromagentic FePt Nanaocrystal Superlatices", Science, vol. 287, pp. 1989-1992, Mar. 17, 2000.*

Giersig, "Multidimensional Nanostructures Based on Single Nanaosized Magnetic Clusters", Proc. Int. Symp. on Cluster Assembled Mater., Sep. 2001.*

Shafi et al., "Surfactant-Assisted Self-Organization of Cobalt Nanoparticles in a Magnetic Fluid," Advanced Materials, vol. 10, No. 8, Jun. 2, 1998, pp. 590-593.

Sugawara et al., "Room-Temperature Dipole Ferromagnetism in Linear-Self-Assembling Mesoscopic Fe Particle Arrays," The American Physical Society, vol. 56, No. 14, Part, Oct. 1, 1997, pp. R8499-R8502.

1/1—(C) INSPEC/IEE, XP-002205895, Sun et al., "Monodisperse FePt Nanoparticles and Ferromagnetic FePt Nanocrystal Superlattices," Science, vol. 287, No. 5460, Mar. 17, 2000, 1 pg.

Turgut et al., "Magnetic Properties and Microstructural Observations of Oxide Coated FeCo Nanocrysals Before and After Compaction," Journal of Applied Physics, vol. 85, No. 8, Apr. 15, 1999, pp. 4406-4408.

Li et al., "Synthesis and Characterization of Co Nanoparticles by Solventless Thermal Decomposition", Solid State Phenomena, (2007), pp. 71, vol. 119, Trans Tech Publications, Switzerland.

Puntes et al, "Synthesis, self-assembly, and magnetic behavior of a two-dimensional superlattice of single-crystal E-Co nanoparticles", Applied Physics Letters, Apr. 9, 2001, pp. 2187-2189, vol. 78, No. 15, American Institute of Physics.

Sun et al, "Single-Crystal Iron Nanowire Arrays", Solid State Phenomena, Mar. 10, 2007, pp. 17, vols. 121-123, Trans Tech Publications, Switzerland.

Cordente et al, "Synthesis and Magnetic Properties of Nickel Nanorods", Nano Letters, Jun. 28, 2001, pp. 565-568, vol. 1, No. 10, American Chemical Society.

Dumm et al, "Magnetism of ultrathin FeCo (001) films on GaAs (001)", Journal of Applied Physics, May 1, 2000, pp. 5457-5459, vol. 87, No. 9, American Institute of Physics.

Gromov et al, "Electromagnetic analysis of layered magnetic/conductor structures", Appl. Phys. 33, Jun. 9, 1999, PII: S0022-3727(00)05886-1, IOP Publishing LTD, United Kingdom.

Huijbregtse et al, "High-frequency permeability of soft-magnetic Fe-Hf-O films with high resistivity", J. Appl. Phys., Feb. 1, 1998, pp. 1569-1574, vol. 83, No. 3, American Institute of Physics.

Kim et al, "Magnetic Properties of NiZnCu Ferrite Powders and Thin Films Prepared by a Sol-Gel Method", IEEE Transactions on Magnetics, Jul. 2001, pp. 2362-2365, vol. 37, No. 4, IEEE.

Klemmer et al, "Ultrahigh frequency permeability of sputtered Fe-Co-B thin films", Journal of Applied Physics, Jan. 15, 2000, pp. 830-833, vol. 87, No. 2, American Institute of Physics.

Mercier et al, "Magnetic resonance in spherical Co-Ni and Fe-Co-Ni particles", Physical Review B, Jul. 1, 2000, pp. 532-544, vol. 62, No. 1, The American Physical Society.

Murray et al, "Synthesis and Characterization of Monodisperse Nanocrystals and Close-Packed Nanocrystal Assemblies", Annu. Rev. Mater. Sci. 2000., 30:pp. 545-610, Annual Reviews.

Park et al, "Synthesis and Magnetic Studies of Uniform Iron Nanorods and Nanospheres", J. Am. Chem. Soc. 2000, May 12, 2000, pp. 8581-8582, 122, American Chemical Society.

Puntes et al, "Colloidal Nanocrystal Shape and Size Control: The Case of Cobalt", Science Reports, Mar. 16, 2001, pp. 2115-2117, vol. 291, www.sciencemag.org.

Sun et al, "Monodisperse FePt Nanoparticles and Ferromagnetic FePt Nanocrystal Superlattices", Science Reports, Mar. 17, 2000, pp. 1989-1992, vol. 287, www.sciencemag.org.

* cited by examiner

MAGNETIC NANOMATERIALS AND SYNTHESIS METHOD

FIELD OF THE INVENTION

The present invention relates generally to magnetic nanoparticles and method of synthesising magnetic nanoparticles. More specifically, the invention relates to ferromagnetic nanoparticles made upon decomposition of organometallic precursors, used for example in high density information storage media, light emitting diodes, passive components such as transformers, on-chip signal isolation, inductors, and the like, to improve passive component performance in high frequency integrated circuit applications.

BACKGROUND OF THE INVENTION

In high frequency integrated circuit applications, such as used in wireless portable electronic devices, there is a demand for miniaturisation, greater functionality, higher performance, and lower cost, which can be achieved through the integration of passive components such as inductors and transformers in integrated circuits. The lack of passive component integration on integrated circuits contributes to a passives-to-actives component ratio as high as 100:1 in typical electronic systems. However, current passive components, when integrated with active elements on integrated circuits consume large areas of silicon, making their integration often not economical. Therefore, methods are developed to reduce the space used up by passive components on integrated circuits.

One approach to reduce the area of an inductor in an integrated circuit is through the integration of magnetic materials, for example materials that have a permeability greater than one. The aim of this approach is to increase the inductance per unit area through taking advantage of the increased electromagnetic energy storage capability of high-permeability materials. The associated size reduction of the inductor enables enhanced performance (higher Q-factor) through reduced series resistance and reduced parasitic capacitance. In transformers, the same materials properties enable an increased coupling coefficient, hence increasing the energy transfer in a transformer while also enabling smaller area through confining the electromagnetic field lines within the magnetic material, hence allowing increased device packing density. The traditional method for achieving such passive device improvements is using amorphous or crystalline solid thin film magnetic materials, such as for example as disclosed in EP0716433. However, at high frequency applications, for example high MHz or low GHz frequencies, methods such as this have performance limitations due to eddy current losses and loss-generating ferromagnetic resonance (FMR).

An attempt to overcome these associated deficiencies has been to spatially separate and electrically isolate magnetic nanoparticles, i.e. particles of nanometer size, such that the material is ferromagnetic at device operating temperatures, and preferably being composed of a single magnetic domain. Since eddy current losses can be suppressed and the FMR decay extended to higher frequencies, the magnetic nanoparticles allow an increase in inductance density per unit area in the MHz-GHz range. It is important, however, that the composite magnetic nanoparticle material has properties such as a magnetic permeability ($\mu$), i.e. greater than 1 (one), and corresponding losses ($\mu''$) such that the quotient of (permeability)/(loss) is, for example, greater than 5 in the MHz—GHz frequency range of interest.

Several methods have been attempted to produce nanoparticles with some of these qualities, and generally fall in three categories: physical methods, template methods and chemical methods.

Physical methods such as sputtering and epitaxy (See for instance Y. M. Kim et al, IEEE Trans. on Magn. vol. 37, no. 4, 2001, and M. Dumm et al, Journal of Applied Physics vol. 87, no. 9, 2000, respectively) produce thin layers. However, both methods produce high permeability films only up to approximately 500 MHz and generally cannot be thicker than 2-3 micrometers in order to minimise eddy current losses. However, such performance is not sufficient for an effective magnetic field confinement needed to enhance passive devices.

Template methods such as the one described by Cao, H., Xu, Z., Sang, H., Sheng, D., Tie, C. Adv. *Mater.* 2001, vol. 13, p. 121 grow, usually electrochemically, nanorods or nanowires within the channels of inorganic or track-etched organic matrices. The main drawback of this method comes from the destruction of the organic or inorganic matrix after the particle formation that yields by-products, which generally interfere with the nanoparticles. This results in a decrease of the saturation magnetization compared to that of bulk metal and may also prevent the formation of high density material.

Chemical methods like chemical reduction or decomposition of a carbonyle precursor such as described by Sun, S. Murray, C. B. *J. Appl. Phys.* 1999, vol. 85, p. 4325 or by Alivisatos, P. Puntes, V. F. Krishnan, K. M. *Appl. Phys. Lett.* 2001, vol. 78, p. 2187 involve synthesis of nanoparticles in solutions. The chemical methods, and more specifically the method of Sun et al. results in the production of self-assembled monodisperse spherical cobalt particles from a carbonyl cobalt precursor for use in high-density recording. However, due to their small size, the particles remain superparamagnetic at room temperature, and hence will not generate the required magnetic field confinement as achieved by high permeability materials. Additional work has been disclosed by the same authors in Sun, S. Murray, C. B. Weller, D. Folks, L. Moser, A. *Science* 2000, vol. 287, p. 1989 generating iron-platinum (Fe/Pt) particles to enhance the magnetic anisotropy of the material. However, similarly to above, the small size of the particles in the material makes them superparamagnetic, hence not useful for magnetic field confinement. In Puntes, V. F. Krishnan, K. M. Alivisatos, A. P. *Science* 2001, vol. 291, p. 2115 cobalt nanorods are produced from a carbonyl cobalt precursor by using a mixture of oleic acid and trioctylphosphine oxide (TOPO). However this requires a high temperature process of, for example, approximately 300° C. Moreover, the nanorods obtained in this way are not thermodynamically stable and typically spontaneously rearrange into spherical nanoparticles within the first few seconds of the reaction. Iron and Nickel nanorods have also been recently reported through decomposition of, respectively $Fe(CO)_5$ (Park, S.-J.; Kim, S.; Lee, S.; Khim, Z. G.; Char, K.; Hyeon, T. *J. Am. Chem. Soc.* 2000, vol. 122, p. 8581) and $Ni(COD)_2$ (N. Cordente, C. Amiens, F. Senocq, M. Respaud, and B. Chaudret, *Nano Letters* 2001, 1(10), p. 565) in the presence of ligands such as TOPO and hexadecylamine (HDA). Both materials are not homogeneous (particles do not display the same shape). Furthermore, these particles are superparamagnetic at room temperature and hence unsuitable for magnetic field confinement.

Thus, there is a need for a magnetic material consisting of magnetic nanoparticles that are ferromagnetic at room temperature and/or operating temperatures up to for example approximately 105° C., and of homogeneous size, shape, and magnetic orientation. Furthermore, there is a need for a method of making such thermodynamically stable magnetic nanoparticles of adjustable aspect ratio encapsulated within a non-magnetic matrix, so that such final magnetic nanoparticle materials could be used in high frequency integrated circuit applications, such as used in wireless portable electronic devices, to enhance magnetic field confinement in a variety of passive and active devices.

BRIEF DESCRIPTION OF THE DRAWINGS

Embodiments of the invention will now be more fully described, by example, with reference to the drawings, of which.

DESCRIPTION OF THE PREFERRED EMBODIMENTS

In high frequency integrated circuit applications, such as used in wireless portable electronic devices, passive components such as inductors and transformers, as well as structures for signal isolation, can be improved through the integration with magnetic nanoparticle materials. One particular method in accordance with an embodiment of the invention is the use of composite materials comprising of a matrix material containing a certain volume fraction of magnetic nanoparticles that have a saturation magnetization (Ms) and an anisotropy (Hk) where all three (volume fraction, Ms, and Hk) are optimised such that the composite material has a permeability high enough and a ferromagnetic resonance at high enough frequencies such as to allow improved RF-passive devices (such as inductors, transformers, isolation) at high MHz and GHz frequencies. Saturation magnetization (Ms) can be optimised through varying the chemical composition of the nanoparticles. Anisotropy (Hk) can be optimised through the crystal structure, the shape of the nanoparticles and the composite material itself. In addition, in order to take maximum advantage of the electric-field confining property of composite magnetic nanoparticle materials it is required that the axis of anisotropy of the particles are all aligned with each other. The typical approach taken to meet this requirement is to first increase the overall anisotropy of the material, which can be achieved by modifying the shape of the particles. Instead of forming nanospheres one forms more desirable shapes such as elongated particles (ellipsoids, rods, wires or other regular, non-spherical particles). These particles must be large enough to be ferromagnetic at the maximum device operating temperature (e.g. 105° C.) but small enough that they consist preferably of a single magnetic domain (or only a few magnetic domains), i.e. their size has to be in the order of 2 to 30 nm in both, diameter and length. Then, the nanoparticles are self-assembled and are electrically isolated from each other through a ligand shell or other means of insulating layers, such as a native oxide shell, a silicon oxide coating or other insulating coatings. However, ideally the material that contains the nanoparticles should be highly resistive, act as an oxidation inhibitor for the nanoparticles, and be chemically stable for temperatures of at least up to, for example, approximately 150° C.

Figure 1:
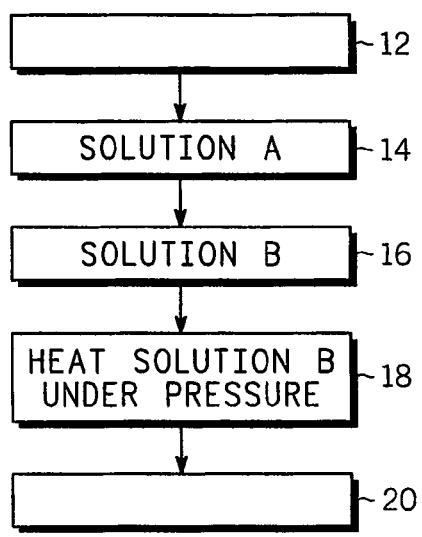
FIG. 1 shows a method of preparing magnetic nanoparticles according to an embodiment of the invention.

FIG. 1 shows a method 10 of preparing magnetic nanoparticles according to an embodiment of the invention. The method starts at 12 with a solution A at 14 that comprises a solvent, preferably an ether or an aromatic solvent such as toluene, anisole, dioctylether, or the like, that is added to a carboxylic acid, preferably Oleic acid, or the like. An amine, preferably Oleylamine or the like is then added to the solvent and Oleic acid solution to complete solution A. Of course, it will be appreciated that other solvents or amines not listed here may be used to perform the same decomposition. The next step 16 involves adding solution A to a metal-organic precursor such as a cobalt precursor $Co(\eta^3-C_8H_{13})(\eta^4-C_8H_{12})$ to form solution B. It will be appreciated that other metal precursors may be used such as hydrocarbon metal complexes like $Ni(\eta^4-C_8H_{12})_2$, and $Fe(C_9H_7)_2$, or the like. It will also be appreciated that the components of solutions may be added and mixed together in any order to form solution B. At step 18, solution B is heated, for example by radiation at approximately 150° C. in anisole for approximately 48 hours, under pressure, for example 3 Bars of H2. In this embodiment, spherical monodisperse cobalt nanoparticles coalesce into nanorods of uniform shape over the process time at step 18, however, in this embodiment nanorods begin to appear in the solution after approximately 10 hours of reaction. The nanorods are crystalline hexagonal close packed (hcp), and grow along the c axis of the structure. The nanorods are in a thermodynamically stable form of cobalt after completion of the reaction which might take many hours. These thermodynamically stable cobalt nanorods will not rearrange into other forms such as spherical nanoparticles or any other form.

Figures 2, 3:
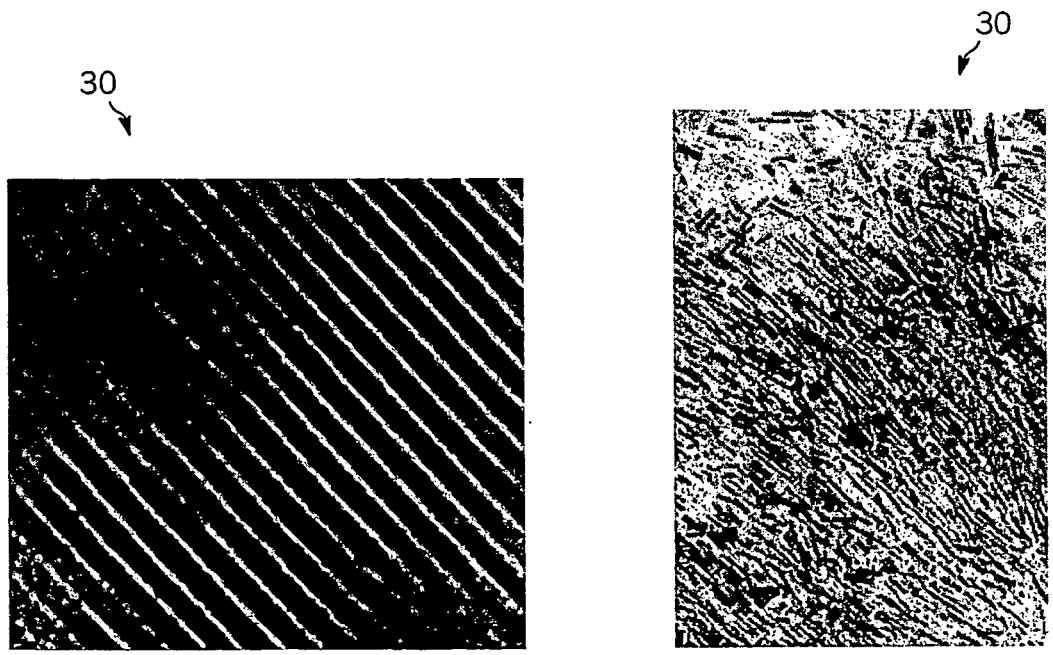
FIG. 2 shows a High Resolution Transmission Electron Micrograph (HRTEM) of magnetic nanoparticles with growth alignment along a preferred axis (e.g. c-axis) according to an embodiment of the invention.
FIG. 3 shows a Transmission Electron Micrograph (TEM) of a high density, self-assembly of magnetic nanoparticles according to an embodiment of the invention.

The high yield synthesis, for example nearly 70% of the cobalt initially introduced in the solution is found in the nanorods, of this method results at step 20 in air-stable nanorods aligned along the same axis, e.g. c-axis, and of uniform diameter size, as shown in FIGS. 2 and 3.

FIG. 2 shows a High Resolution Transmission Electron Micrograph (HRTEM) of an assembly 30 of magnetic nanoparticles forming a magnetic nanomaterial with growth alignment along the c-axis according to an embodiment of the invention. FIG. 2 also shows that the nanorods are self-organized in a two dimensional lattice with very regular space between the nanorods. Shown in FIG. 3 are, at a lower magnification than in FIG. 2, high-density or high volume fraction (for example, volume fraction of magnetic nanorods larger than 30%), self-assembled Co nanorods with growth direction along the c-axis.

The nanoparticles that result from this embodiment exhibit magnetic properties, such as for example: i) saturation magnetization similar to the magnetic characteristics and properties of bulk cobalt; ii) enhanced magnetic anisotropy and strongly enhanced coercive magnetic field (as compared to bulk cobalt and spherical nanoparticles) due to the shape anisotropy. Here the coercive field is mainly determined by the shape anisotropy. For example in spherical nanoparticles of 4.9 nm diameter, the magnetic anisotropy Hc=800 Gauss, but for the nanorods obtained with oleylamine and oleic acid as stabilizing agents, Hc=8900 Gauss; and iii) ferromagnetism at room temperature (or higher) while remaining single domain.

Figure 4:
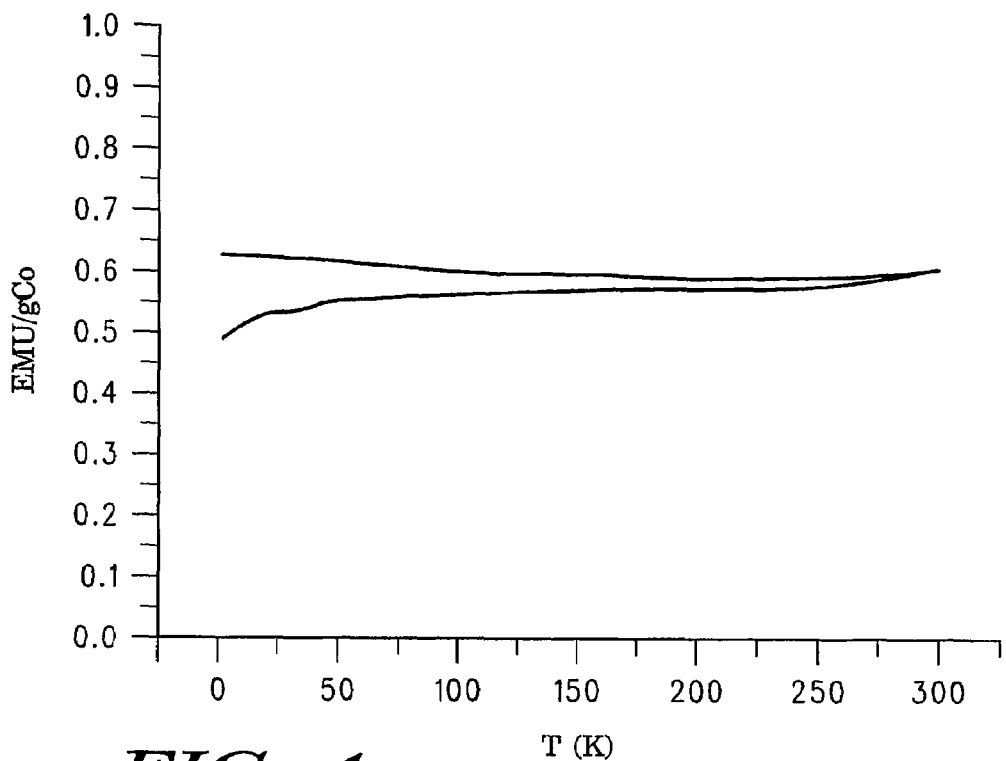
FIG. 4 shows a graph of the magnetisation measurements according to a Zero Field Cooling/Field Cooling (ZFC/FC) process between 2 and 300K, under a weak magnetic field of approximately 10G, where magnetisation values are normalised against the cobalt content in the sample as determined from chemical microanalysis, according to an embodiment of the invention.
Figure 5:
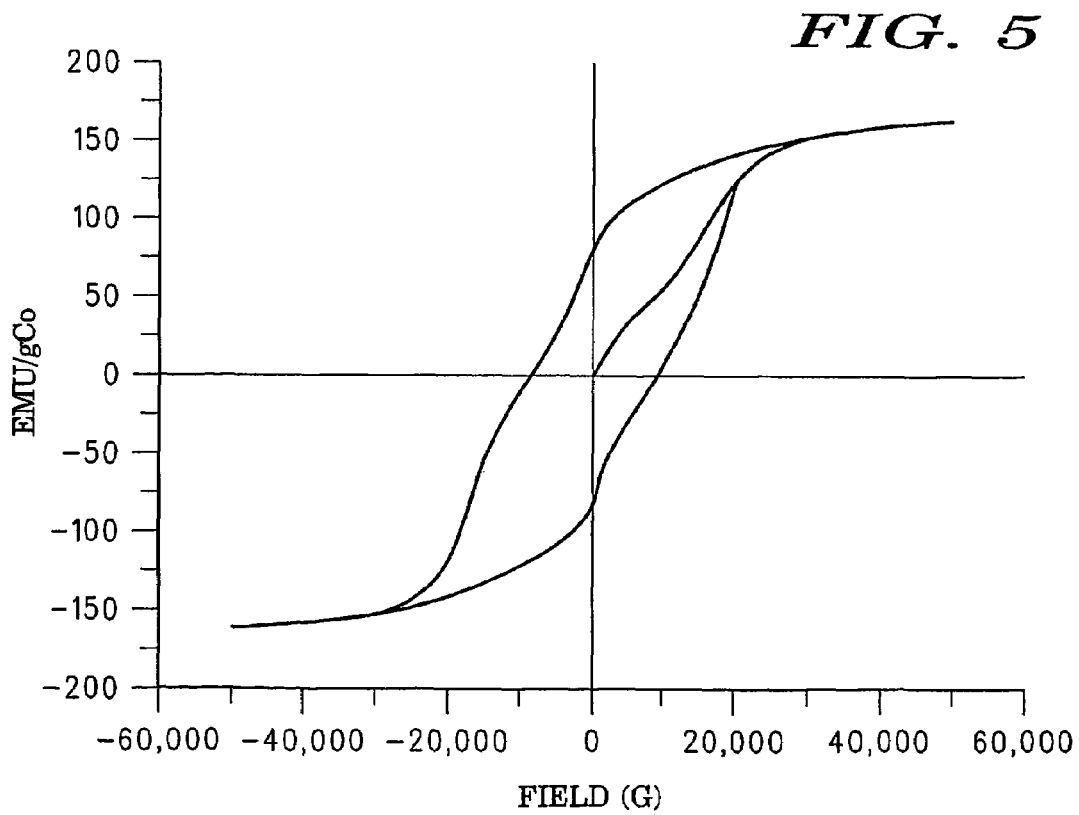
FIG. 5 shows a hysteresis loop at 300K between +5 and −5T of magnetic nanoparticles where magnetisation values are normalised against the cobalt content in the sample as determined from chemical microanalysis according to an embodiment of the invention.

FIGS. 4 and 5 show magnetic properties of cobalt nanoparticles according to an embodiment of the invention. FIG. 4 shows the evolution of the magnetization of the magnetic nanoparticles under a constant weak field of 10 Gauss when the temperature is raised from 2K to 300K and then decreased from 300K to 2K.

FIG. 5 represents another set of results from an embodiment of the invention under another set of conditions, where saturation magnetization ($M_S$)=160 Electro-Magnetic Unit (EMU)/gCo, remanent magnetization ($M_R$)=80 EMU/gCo, anisotropy of the coercive field ($H_C$)=8900 Gauss, and the magnetic moment ($\mu$)=1,69 $\mu$B. FIG. 5 shows a hysteresis loop (magnetization as a function of applied magnetic field) at room temperature of the magnetic cobalt nanoparticles. The temperature is kept constant at 300K and the magnetization is recorded as a function of the applied magnetic field (from 0T to 5T, to −5T and back to +5T, hence closing the applied magnetic field cycle).

Figure 6:
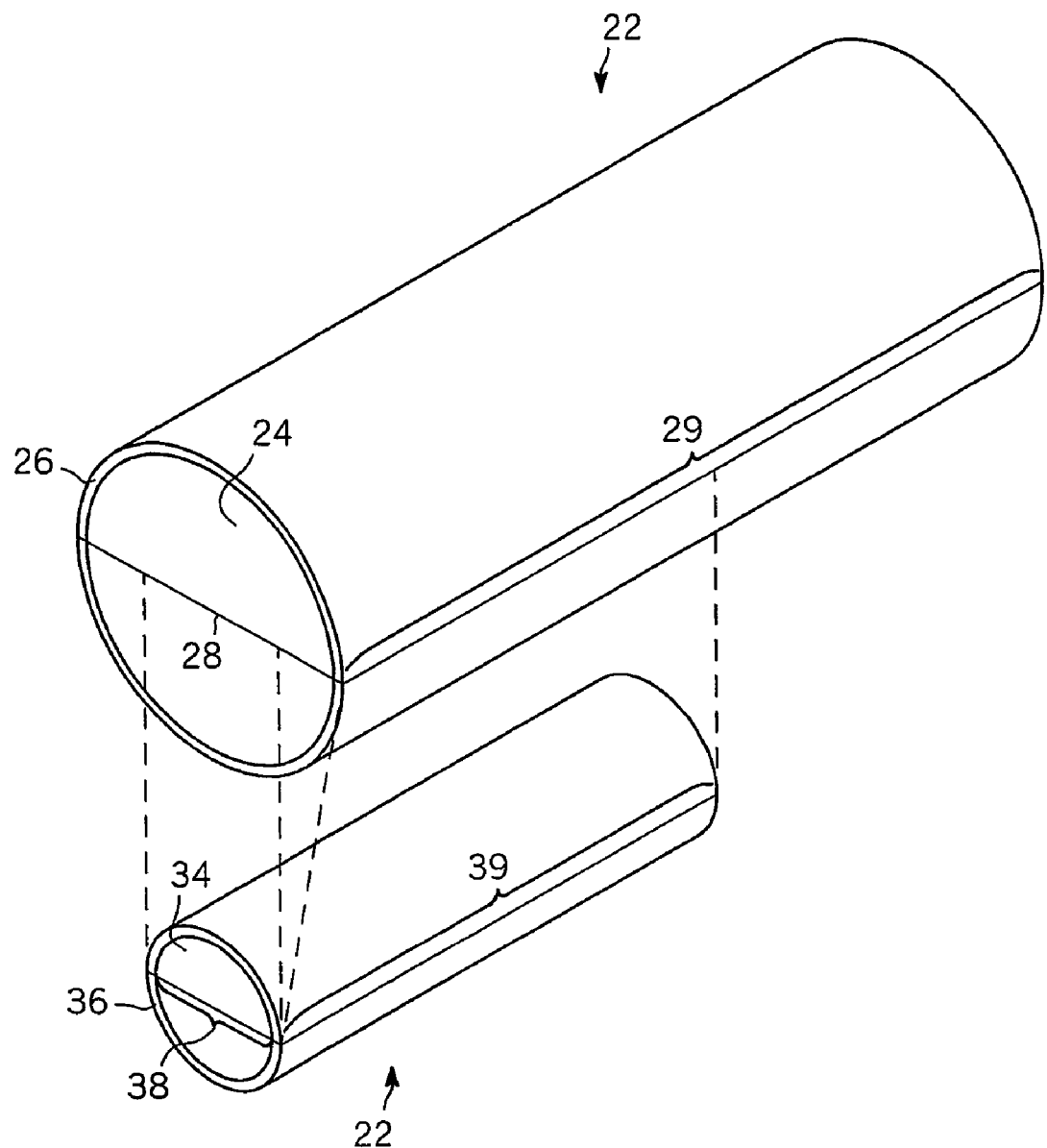
FIG. 6 shows a schematic drawing of a thermodynamically stable magnetic nanoparticle with adjustable aspect ratio according to an embodiment of the invention.

The decomposition of the organometallic precursor at step 18 may be achieved within, for example, 48 hours at 150° C. in anisole, and provides a high yield, for example, approximately 70% in organized nanomaterial that in this embodiment is composed of individual nanorods having dimensions of, for example, approximately 9 nm in diameter and of a length of 50-100 nm as shown in FIGS. 2 and 3. It will be appreciated that by modifying the amine/acid ratio the anisotropy of the nanomaterial can change. FIG. 6 shows a schematic drawing of a thermodynamically stable magnetic nanoparticle 22 according to an embodiment of the invention. The magnetic core 24,34 that is ferromagnetic at a room/operating temperature and a non-magnetic encapsulating material 26,36 that encapsulates the magnetic core to make the magnetic nanoparticle electrically isolated and protected from atmospheric contaminants. The magnetic nanoparticle may have a predetermined adjustable aspect ratio such that diameter 28,38 and length 29,39 may be modified in accordance to the amine/acid ratio. For example, the amine/acid ratio can be modified to yield nanorods with various dimensions and various aspect ratios [l/d (29/28)], for example the diameter range may be from approximately 5 nm to 30 nm, and the length may range from approximately 10 nm to 100 nm. Thus, examples include going from 1 equivalent of oleic acid to 2 equivalents of oleic acid results in the formation of nanowires (7 nm×600 nm approximately). Similarly, the nanorods aspect ratio (length/width) may be controlled by changing the amine chain-length, for example, 1 equivalent of octylamine (8 carbon atoms) with 1 equivalent of oleic acid produces nanorods of 10 nm×17 nm. In another example, 1 equivalent of hexadecylamine (16 carbon atoms) with 1 equivalent of oleic acid produces nanorods of 6 nm×125 nm. In another example, using 1 equivalent of octadecylamine (18 carbons atoms) with 1 equivalent of oleic acid produces nanorods around 6 nm×45 nm. Of course it will be appreciated that other variations may be used to control the anisotropy of the nanomaterial.

In this embodiment, the nanoparticles are single crystalline and display the hcp structure of bulk cobalt, such that each particle is aligned along the c-axis of the hcp structure. The nanoparticles are spaced apart by a distance of, for example, 3 nm, which corresponds to the total width of the ligand shell between two neighbouring nanoparticles.

Thus, in this embodiment, the ferromagnetic nanoparticles, for example nanorods, synthesised contain a ligand shell, for example oleylamine and oleic acid, any combination of carboxylic-acid/amine or any amine or acid, or the like, which has multiple beneficial consequences. For example, the organic ligands serve some of the following purposes: i) induce the anisotropic growth of the nanoparticles with the main axis coinciding with the c_axis of the hcp crystallographic structure ii) protect the nanoparticles from air oxidation and other chemical reactions such as formation of surface hydroxides, and the like; iii) allow the dispersion of nanoparticles in organic solvents with no detrimental influence on the nanoparticle magnetic properties; iv) allow nanoparticles to self-align along each nanoparticle crystal anisotropy axis; and v) generate electrically isolated particles hence limiting eddy current losses and preventing domain formation across multiple particles which results in improved high-frequency behaviour; and vi) allow particle orientation in magnetic fields to optimise high-frequency device applications.

Of course, it will be appreciated that the method herein described may be used for other ferromagnetic elements such as for example iron, nickel, and the like, and related alloys such as for example FeCo, NiFeCo and the like, and the inclusion of metallic or non-metallic impurities that may be intentionally added with the particles such as, tantalum, boron, oxygen, nitrogen and the like, to modify the magnetic material properties in a predetermined configuration to best suit specific implementations, such as integrated passive component devices.

It will be appreciated that although the particular embodiments of the invention have been described above, various other modifications and improvements may be made by a person skilled in the art without departing from the scope of the present invention.

Additional Text

Statement 1. A thermodynamically stable magnetic nanoparticle (22) comprising a magnetic core (24,34) that is ferromagnetic at a room/operating temperature and a non-magnetic constituent (26,36) encapsulating the magnetic core to make the magnetic nanoparticle electrically isolated and protected from atmospheric contaminants with the magnetic nanoparticle having a predetermined adjustable aspect ratio and having a permeability and ferromagnetic resonance suitable for use in MHz-GHz range frequencies.

Statement 2. A thermodynamically stable magnetic nanoparticle (22) of statement 1 wherein the magnetic core (24,34) is comprised of a ferromagnetic element selected from the group consisting of Fe, Go, and Ni.

Statement 3. A thermodynamically stable magnetic nanoparticle (22) of statement 1 wherein the magnetic core (24,34) is comprised of a binary or tertiary alloy of ferromagnetic element selected from the group consisting of Fe, Go, and Ni.

Statement 4. A thermodynamically stable magnetic nanoparticle (22) of any preceding statement wherein the magnetic core (24,34) comprises a single magnetic domain.

Statement 5. A thermodynamically stable magnetic nanoparticle (22) of any preceding statement wherein the magnetic nanoparticle has a diameter (28,38) and length (29,39) in the range of approximately 2 to 600 nm.

Statement 6. A thermodynamically stable magnetic nanoparticle (22) of statement 5 wherein the crystalline structure of the ferromagnetic core (24,34) is hexagonal close packed.

Statement 7. A thermodynamically stable magnetic nanoparticle (22) of statement 5 wherein the crystalline structure of the ferromagnetic core (24,34) is body center cubic.

Statement 8. A thermodynamically stable magnetic nanoparticle (22) of statement 5 wherein the crystalline structure of the ferromagnetic core (24,34) is face center cubic.

Statement 9. A thermodynamically stable magnetic nanoparticle (22) of any preceding statement wherein the non-magnetic constituent (26,36) encapsulating the magnetic core (24,34) is an organic ligand.

Statement 10. A thermodynamically stable magnetic nanoparticle (22) of statement 9 wherein the organic ligand is a combination of amine and carboxylic acid.

Statement 11. A thermodynamically stable magnetic nanoparticle (22) of statement 9 or 10 wherein the organic ligand is a combination of oleylamine and oleic acid.

Statement 12. A magnetic nanomaterial (30) comprising an assembly of thermodynamically stable magnetic nanoparticles (22) of any preceding statements.

Statement 13. A magnetic nanomaterial (30) of statement 12 wherein each magnetic nanoparticle (22) has an axis of anisotropy aligned with each other magnetic nanoparticle.

Statement 14. A magnetic nanomaterial (30) of statement 12 or 13 wherein each magnetic nanoparticle (22) of the magnetic nanomaterial is of homogeneous size, shape, and magnetic orientation.

Statement 15. A magnetic nanoparticle (22) of any preceding statement for use in passive components in high frequency integrated circuit applications.

Statement 16. A method for synthesising a magnetic nanoparticle (22) comprising the steps of:
providing a first solution (14) comprising a solvent with a carboxylic acid and an amine;
adding the first solution (16) to a metal-organic precursor to form a second solution;
heating the second solution (18) under pressure for a predetermined period to produce a thermodynamically stable magnetic nanoparticle (22) comprising a magnetic core (24,34) that is ferromagnetic at a room/operating temperature, and a non-magnetic constituent (26, 36) encapsulating the magnetic core to make the magnetic nanoparticle protected against atmosphere contaminants and electrically isolated with the magnetic nanoparticle having a predetermined adjustable aspect ratio, and having a permeability and ferromagnetic resonance suitable for use in MHz-GHz range frequencies.

Statement 17. A method for synthesising a magnetic nanoparticle (22) as stated in statement 16 wherein said providing a first solution step (14) further comprises adding an ether as the solvent.

Statement 18. A method for synthesising a magnetic nanoparticle (22) as stated in statement 16 wherein said providing a first solution step (14) further comprises adding an aromatic solvent selected from the group consisting of toluene and anisole.

Statement 19. A method for synthesising a magnetic nanoparticle (22) as stated in any of statements 16-18 wherein said providing a first solution step (14) further comprises adding an oleic acid as the carbocylic acid.

Statement 20. A method for synthesising a magnetic nanoparticle (22) as stated in any of the statements 16-19 wherein said providing a first solution step (14) further comprises adding an oleylamine as the amine.

Statement 21. A method for synthesising a magnetic nanoparticle (22) as stated in any of statements 16-20 wherein said adding the first solution step (14) further comprises adding a hydrocarbon metal complex as the metal-organic precursor.

Statement 22. A method for synthesising a magnetic nanoparticle (22) as stated in any of statements 16-21 wherein said adding the first solution step (14) further comprises adding a cobalt precursor as the metal-organic precursor.

Statement 23. A method for synthesising a magnetic nanoparticle (22) as stated in any of statements 16-22 wherein said heating step further (18) comprises heating at temperatures between 100 and 250° C. for approximate times between 3 and 60 hours under pressures between 1 and 10 Bars of H2 or H2 containing gas mixtures.

The invention claimed is:

1. A method for synthesising a magnetic nanomaterial comprising an assembly of magnetic nanoparticles comprising the steps of:
providing a first solution comprising a solvent with a carboxylic acid and an amine;
adding the first solution to a metal-organic precursor to form a second solution;
heating the second solution under pressure for a predetermined period to produce an assembly of thermodynamically stable magnetic nanoparticles each comprising a magnetic core that is ferromagnetic at a room temperature and/or an operating temperature between room temperature and 105°C., and a non-magnetic constituent encapsulating the magnetic core to make the magnetic nanoparticles protected against atmosphere contaminants and electrically isolated, the process conditions being adjusted so that the magnetic nanoparticles have a selected aspect ratio, and the nanomaterial having a permeability and ferromagnetic resonance suitable for use in MHz-GHz range frequencies.

2. A method for synthesising a magnetic nanomaterial as claimed in claim 1 wherein the solvent in said first solution step comprises an ether.

3. A method for synthesising a magnetic nanomaterial as claimed in claim 1 wherein the solvent in said first solution step comprises an aromatic solvent selected from the group consisting of toluene and anisole.

4. A method for synthesising a magnetic nanomaterial as claimed in claim 1 wherein the carboxylic acid in said first solution step comprises an oleic acid.

5. A method for synthesising a magnetic nanomaterial as claimed in claim 1 wherein the amine in said first solution step comprises an oleylamine.

6. A method for synthesising a magnetic nanomaterial as claimed in claim 1 wherein the metal-organic precursor in said first solution step comprises a hydrocarbon metal complex.

7. A method for synthesising a magnetic nanomaterial as claimed in claim 1 wherein said heating step comprises heating at temperatures between 100 and 250° C. for times between 3 and 60 hours under pressures between 1 and 10 Bars of $H_2$ or $H_2$-containing gas mixtures.

8. A method for synthesising a magnetic nanomaterial as claimed in claim 1 wherein said magnetic cores comprise a ferromagnetic element selected from the group consisting of Fe, Go, and Ni, and the metal-organic precursor in said first solution step comprises a precursor of the selected ferromagnetic element.

9. A method for synthesising a magnetic nanomaterial as claimed in claim 1 wherein said magnetic cores comprise a binary or tertiary alloy of ferromagnetic elements selected from the group consisting of Fe, Co, and Ni, and the metal-organic precursor in said first solution step comprises a precursor of the selected ferromagnetic elements.

* * * * *

UNITED STATES PATENT AND TRADEMARK OFFICE
CERTIFICATE OF CORRECTION

| | |
|---|---|
| PATENT NO. | : 7,429,339 B2 |
| APPLICATION NO. | : 10/505701 |
| DATED | : September 30, 2008 |
| INVENTOR(S) | : Philippe Renaud et al. |

Page 1 of 1

It is certified that error appears in the above-identified patent and that said Letters Patent is hereby corrected as shown below:

In Column 8, Line 57, Claim No. 8:

Change "Go" to --Co--

Signed and Sealed this

Second Day of June, 2009

JOHN DOLL
*Acting Director of the United States Patent and Trademark Office*